Patented Mar. 15, 1932

1,849,492

UNITED STATES PATENT OFFICE

HARRY M. LARMOUR AND STEPHEN C. PIERCE, JR., OF MERCED, CALIFORNIA, ASSIGNORS TO YOSEMITE PORTLAND CEMENT CORPORATION, OF MERCED, CALIFORNIA, A CORPORATION OF DELAWARE

CLINKER HEAT TREATMENT

No Drawing. Application filed March 19, 1929. Serial No. 348,351.

This invention relates to the treatment of cement clinker whereby it is cooled while kept from the influence of oxygen as generally described and claimed in our copending application for patent filed simultaneously herewith under Serial No. 348,352, and the objects of the present application are specific modifications of the process whereby equal beneficial results may be obtained in a different way.

In general, the process of the copending case consists of confining the hot clinker as received from the kiln in some kind of a container whereby free access of oxygen is prevented until the clinker is sufficiently cooled for grinding into cement, and also the introduction into the hot clinker mass of suitable reducing agents to absorb any oxygen present.

In the present process a similar result is accomplished by reheating the clinker discharged from the kiln, in a retort in any manner to prevent access of free oxygen so as to bring the temperature back to substantially clinkering point, or from 2000 to 2800 degrees F., and to thereafter permit the mass to cool while protecting the same from access of oxygen or air, either cooled spontaneously or preferably by the process of the copending case.

The procedure was evolved through a difficulty in the process of the copending case of securing the clinker at sufficiently high temperature at the point of discharge from the kiln as there is a substantial zone of cooling traversed by air feed through which the clinker passes after coming from the clinkering zone.

It may be that the mechanical difficulties of obtaining a discharge of clinker from the ordinary kiln will be overcome so that it will emerge at substantially clinkering temperature, so that it may be then passed directly through the process of our copending case to secure maximum benefits, and to this end we have installed auxiliary steam-oil burners adjacent the discharge end of a rotary cement kiln to reheat the clinker with flame free from excess oxygen, preferably of a reducing nature, and such installation would constitute one manner of carrying out our present invention.

Another method is as suggested, by taking the clinker at reduced temperature as now discharged from a cement kiln and transferring it to any suitable kiln or retort for reheating as described, with or without a quantity of fuel added thereto.

The reheated clinker may be cooled in the retort either spontaneously or preferably by passing over it a non-oxidizing cooling gas such as stack gases from the kiln stack, which have a sufficiently low temperature, or plain carbon monoxide may be used, or carbonic acid gas or nitrogen, depending on what facilities for securing the gas and handling it in continuous flow and cooling are at hand, though flue gas being readily available without cost other than piping and fans, will probably be used. It should of course have a negligible oxygen content when used to cool the reheated clinker.

If desired, the reheated clinker may be cooled by passing through the process described in our copending application above mentioned.

After reducing the heat of the clinker to the point of stability, found to be a point below 600° F. and better below 400° F., it may be stored until ground into cement, or may be ground at once.

We claim:

1. The process of treating Portland cement clinker which comprises reheating the same in unground condition as received after passing through the clinkering temperature of the kiln.

2. The process of treating Portland cement clinker which comprises reheating the same after passing through the clinkering temperature of the kiln back substantially to clinkering temperature through means of a reducing flame.

3. The process of treating Portland cement clinker which comprises reheating the same after passing through the clinkering temperature of the kiln in an atmosphere substantially free from oxygen.

4. The process of treating Portland cement clinker which comprises reheating the same as received after passing through the clinkering temperature of the kiln back substantially to clinkering temperature and cooling the clinker while maintaining it substantially free from contact with oxygen.

5. The process of treating Portland cement clinker which comprises reheating the same as received after passing through the clinkering temperature of the kiln back substantially to clinkering temperature and cooling the clinker while maintaining it substantially free from contact with oxygen by passing a non-oxidizing gas over it.

6. The process of treating Portland cement clinker which comprises reheating the same after passing through the clinkering temperature of the kiln and cooling the clinker while maintaining it substantially free from contact with oxygen by passing flue gases over it containing minimum oxygen.

HARRY M. LARMOUR.
STEPHEN C. PIERCE, Jr.